Nov. 22, 1932.　　　　J. O. HAHS　　　　1,888,763
MECHANICAL HOBBYHORSE
Filed Nov. 11, 1931　　　3 Sheets-Sheet 1
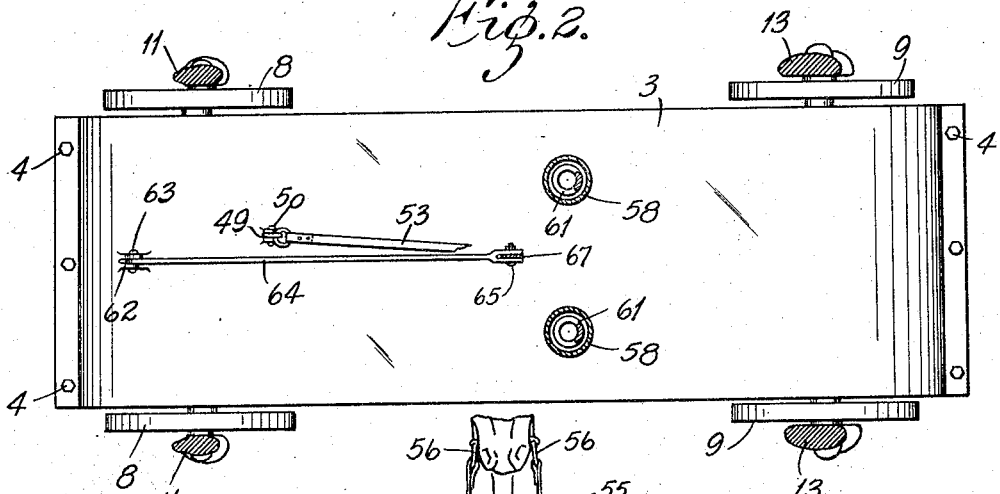
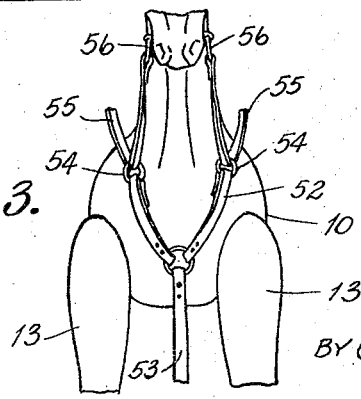
INVENTOR
JAMES OTTO HAHS.
By Bruce A. Elliott
ATTORNEY.

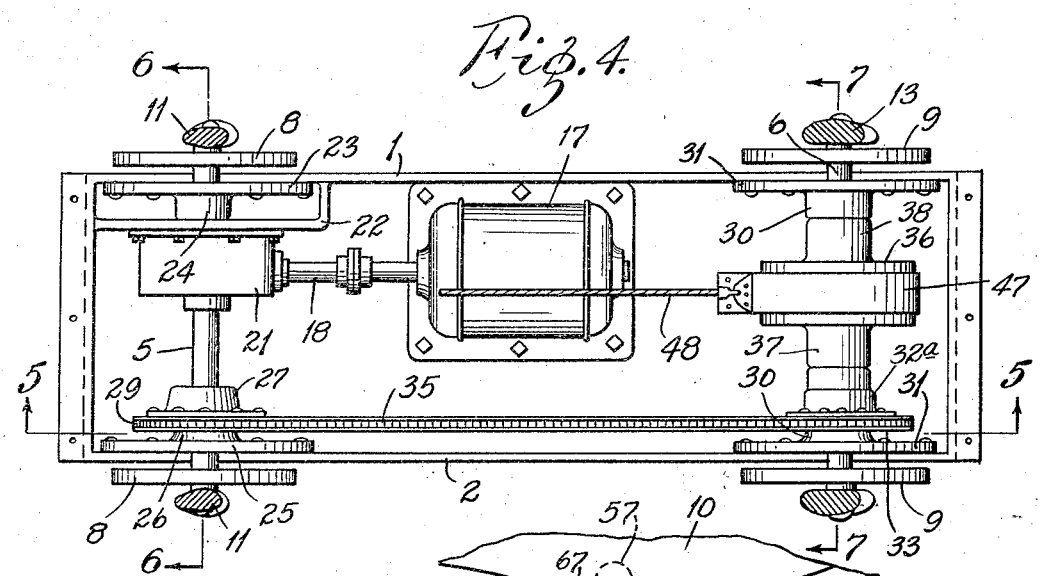
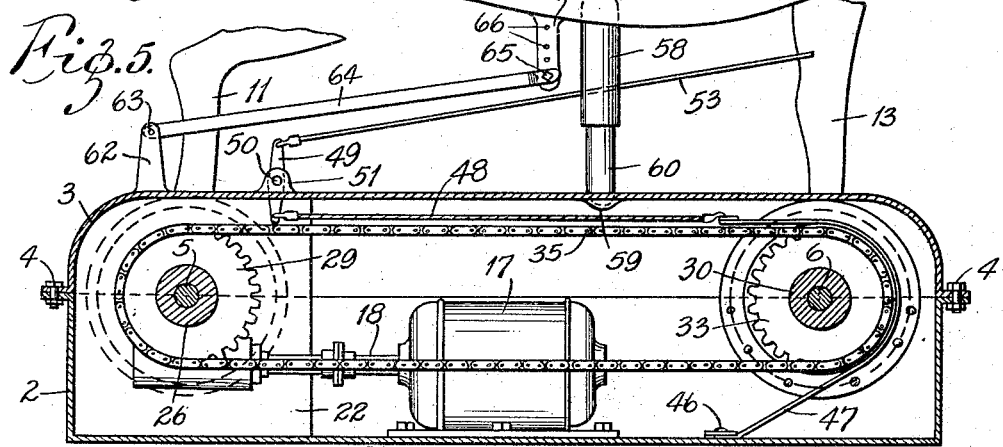
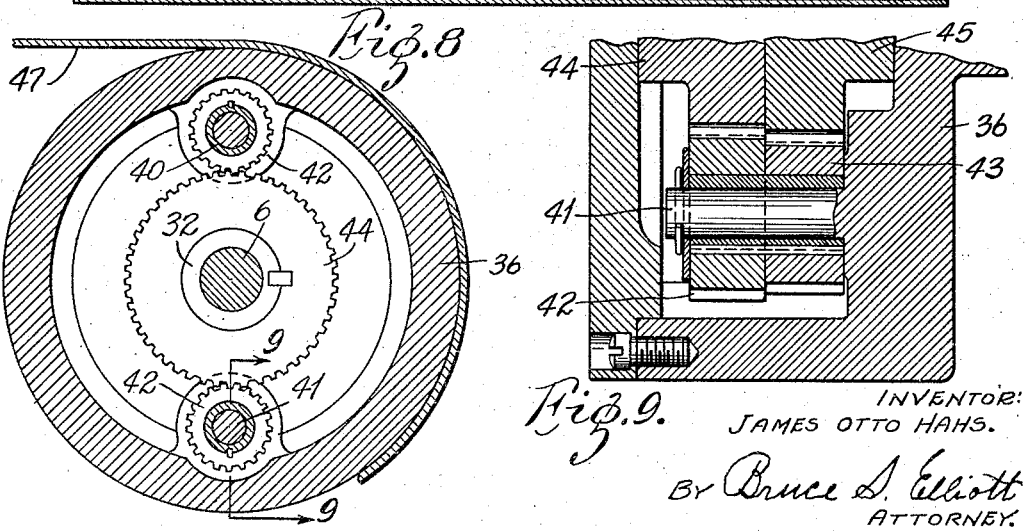

Nov. 22, 1932.  J. O. HAHS  1,888,763
MECHANICAL HOBBYHORSE
Filed Nov. 11, 1931   3 Sheets-Sheet 3
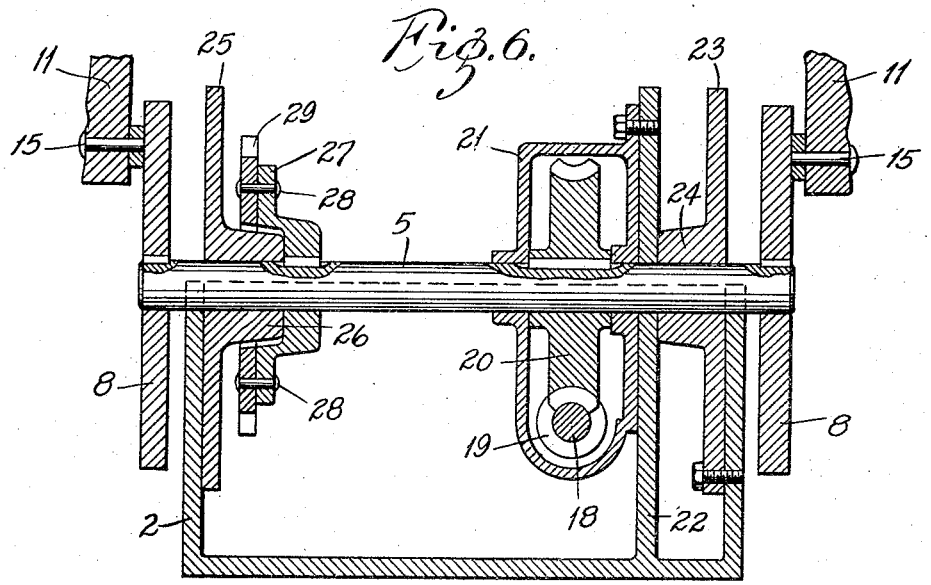
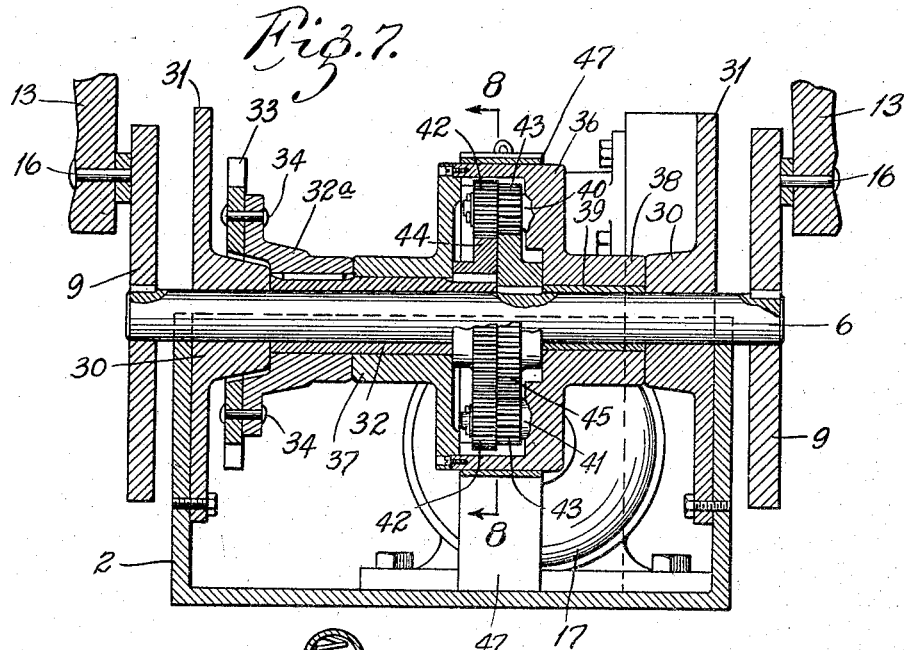
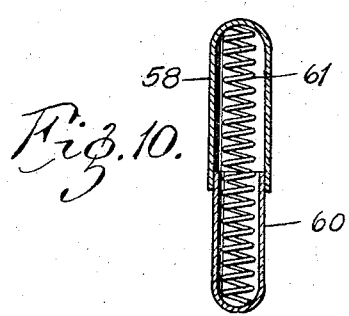
INVENTOR:
JAMES OTTO HAHS.
By Bruce S. Elliott
ATTORNEY.

Patented Nov. 22, 1932

1,888,763

UNITED STATES PATENT OFFICE

JAMES OTTO HAHS, OF SIKESTON, MISSOURI

MECHANICAL HOBBYHORSE

Application filed November 11, 1931. Serial No. 574,303.

This invention relates to improvements in mechanical hobby horses of the type illustrated in my pending application Ser. No. 517,472, filed February 21, 1931.

According to the arrangement shown in the drawings of said application, the horse is continuously rocked by crank members connected, respectively, to the front and hind legs of the horse, and rotating at different rates of speed, so that the gait of the horse is continually changed.

It is the main object of the present invention to provide means, under control of the rider of the horse, whereby the gait of the horse can be changed at will, and the horse continue to operate at the changed gait; or else the gait of the horse may be caused to continually change throughout the cycle of operation provided by the driving mechanism, as in my previous construction.

Preferably, the control member is in the form of a bridle, and the reins of this bridle pass through the rings of a martingale, the inner end of the breast-strap of which is connected to one end of a pivoted lever, the other end of which is connected to a strap operating a brake band. This brake band controls the movement of a rotatable drum containing differential driving mechanism.

With the drum free to rotate, the horse will be rocked uniformly; that is to say, the disks on which the legs of the horse are mounted will travel at the same rates of speed, and the movement of the horse will therefore be uniform. If, however, the rider pulls on the reins of the bridle to operate the brake band, this causes the relation of the movements of the disks to be changed, as the differential driving mechanism is thus caused to function and one set of disks will be caused to travel at a higher rate of speed than the other; and this constant change in the gait of the horse will continue so long as the brake is held applied. Whenever the brake is released, the drum will be free to rotate and thereafter the movement of the horse will be uniform at the gait at which it was operating at the moment the brake was released.

Another object of the invention relates to improved means for yieldingly supporting the horse on the base of the machine.

A still further object relates to improved means for changing the degree of inclination of the horse that will be caused by the revolutions of the operating disks, so that the horse may be caused to have the maximum elevation at both its rear and front ends in the operation of the machine, or any less degree of inclination, down to a very gentle rocking movement.

Finally, other objects of the invention relate to various novel details of construction and combinations and arrangements of parts, whereby the principal objects of the invention are attained.

In the accompanying drawings,

Figure 1 is a view in side elevation of my improved hobby horse;

Figure 2 is a horizontal view taken on the line 2—2 of Figure 1;

Figure 3 is a view in front elevation of the upper portion of the horse, showing the arrangement of the bridle and martingale for operating mechanism to control the gait of the horse;

Figure 4 is a horizontal top plan view on an enlarged scale of the base of the machine with the top thereof removed and the legs of the horse shown in section;

Figure 5 is a longitudinal sectional view taken on the line 5—5 of Figure 4 and viewed in the direction of the arrows;

Figure 6 is a cross sectional view taken on the line 6—6 of Figure 4 and viewed in the direction of the arrows;

Figure 7 is a cross sectional view taken on the line 7—7 of Figure 4 and viewed in the direction of the arrows;

Figure 8 is a transverse section taken on the line 8—8 of Figure 7 and viewed in the direction of the arrows;

Figure 9 is a sectional detail view on an enlarged scale taken on the line 9—9 of Figure 8 and viewed in the direction of the arrows; and Figure 10 is a vertical sectional view on an enlarged scale of one of the yielding supports for the horse.

Referring now to the drawings, the numeral 1, Figures 1, 4 and 5, indicates the base of the hobby horse, which preferably comprises a lower portion 2 and an upper portion 3 provided with flanges by means of which they may be bolted together, as indicated at 4. Extending transversely through the base 1 near the respective ends thereof, are two shafts 5 and 6, these shafts extending through the opposite side walls of the base and being mounted in bearings secured on the inner sides of side walls. Mounted at opposite ends, respectively, of shaft 5 are two crank disks 8, similar crank disks 9 being mounted on opposite ends of the shaft 6.

The numeral 10 indicates the body of the horse, having hind legs 11 pivotally connected thereto at its rear end, as indicated at 12, and front legs 13 pivotally connected thereto at its front end, as indicated at 14. The feet or lower ends of the hind legs 11 are pivotally connected to crank pins 15 (Figure 6) on the crank disks 8, and the front legs 13 have feet or lower ends pivotally connected to crank pins 16 on the crank disks 9, as indicated in Figures 1 and 7.

The disks 8 and 9 are adapted to be rotated either at the same or at differential rates of speed, and the mechanism for rotating the disks, and the means for controlling the variation in the relative speeds of rotation of the disks 8 and 9, will now be described.

The numeral 17, Figures 4 and 5, indicates an electric motor, mounted within the base 1 on the floor thereof, said motor having a shaft 18 projecting from one end and provided on its outer end with a worm 19, (Fig. 6), which meshes with a worm wheel 20 keyed on the rear shaft 5. The worm wheel 20 is incased in a housing 21, which is secured on the side wall of a frame member 22 (Figs. 4 and 6) cast integral with one of the side walls of the base 1. The frame member 22 is hollow, and mounted within it and secured to the side wall of base 1 is a casting 23, affording a bearing 24 for one end of the shaft 5. A similar casting 25, secured to the opposite wall of base 1, affords a bearing 26 for the other end of the shaft. Keyed on the shaft 5 adjacent to the bearing 26 is a cup-shaped circular casting 27, which has secured to its outer face, as by means of rivets 28, a sprocket wheel 29, the said sprocket wheel and the cupped portion of the casting 27 surrounding the bearing 26, but being spaced therefrom. The front shaft 6 is supported at opposite ends in bearings 30 provided by castings 31, (Fig. 7), secured to the side walls of the base 1, in a similar manner to the castings 23 and 25 at the opposite end of the base. Rotatably mounted on shaft 6 is a sleeve 32, and keyed on this sleeve is a circular cup-shaped casting 32a to the outer face of which is secured a sprocket wheel 33, as by means of rivets 34. The cupped portion of casting 32, and the sprocket wheel 33, surround the bearing 30 at one end of shaft 6 at a distance therefrom, the sprocket wheel 33 being in line with the sprocket wheel 29 and operatively connected thereto by means of a sprocket chain 35, Figs. 4 and 5.

The numeral 36 indicates a differential gear housing made in two connected parts, one part having a hub 37 rotatably mounted on sleeve 32, and the other part having a hub 38 rotatably mounted on a sleeve 39, which is also rotatably mounted on the shaft 6. Rotatably mounted on stub shafts 40 and 41 (Figs. 7 and 8) formed integral with one part of the gear housing 36, that at the right shown in Fig. 7, and located at diametrically opposite sides of said housing, are two sets of connected pinions, each set comprising two pinions of different diameters. In the actual embodiment of my invention, the larger pinion 42 of each set has 21 teeth, and the smaller pinion 43 of each set has 20 teeth. Keyed on the sleeve 32 within the gear housing 36, is a gear 44, in mesh with the pinions 42 and having forty-nine teeth. Keyed on the shaft 6 is a larger gear 45, in mesh with the pinions 43, and having fifty teeth.

With the arrangement of gears described, when the sprocket wheel 33 is driven, sleeve 32, gear 44, pinions 42 and 43, gear 45, and shaft 6 will rotate together and at the same rate of speed with the shaft 5, driven by worm 18 and worm gear 20. Thus the crank disks 8 and 9 will be rotated at the same rate of speed, and a uniform movement will be imparted to the horse body 10, which will vary from an up-and-down movement in a vertical plane, if the crank pins 15 and 16 of the respective sets of disks are at the same relative positions with respect to the imaginary circles described by said crank pins, to a rocking movement of greater or less intensity, dependent upon the extent to which one set of crank pins is advanced relative to the other set. Usually, however, the horse body will be rocked in the movement of the crank disks; but whatever the character of the movement, it will be uniform so long as the members of the driving mechanism all rotate in unison and at the same rate of speed, as above described.

A prominent feature of my invention, however, resides in the provision of means under control of the rider for changing the degree of the rocking movement of the horse, and then having the horse operate at the changed gait; or else to effect a continuous change of gait throughout a cycle of operation, or recurring cycles of operation, of the mechanism.

Such change in the degree of rocking movement of the horse is effected by bringing into operation the differential existing between the gears 44, 45 and the pinions 42, 43, either for a short length of time to change the degree of the rocking movement to a desired extent, or for the period of time for which the horse is ridden, to cause the rocking movement to vary in intensity from a minimum to a maximum throughout recurring cycles of operation.

The relation of the driving gears is such that when brought into play the crank disks 8 will be rotated faster than the crank disks 9. That is to say, for every fourteen revolutions of the disks 9 the disks 8 will rotate through fifteen revolutions; and this difference in the speed of the rotation of the two disks effects a constant change in the relation of the crank disks 15 and 16 to each other, which continues through fourteen revolutions of the disks 9, when the cycle of operation is repeated. The mechanism for controlling the rocking movement of the horse will now be described.

Secured at one end to the floor of base 1, as indicated at 46, Fig. 5, is a brake band 47, which partially surrounds the gear housing 36, (Figs. 4, 5 and 7) the periphery of which forms a brake drum, and at its upper end is secured to a cable 48, the other end of which is secured to the lower end of a lever arm 49, Fig. 5, which is pivoted intermediate its ends, as indicated at 50, in bearings 51 provided on the top of the base section 3. The numeral 52, Figs. 1 and 3, indicates a martingale having a breast-strap 53, which is extended rearwardly and is connected at its inner end to the upper end of the lever arm 49. The martingale, as usual, has two straps extending upward over the chest of the horse and provided at their upper ends with rings 54, through which pass the bridle reins 55. The reins 55 are secured at their ends in rings 56, fastened on either side of the mouth of the horse to simulate a bit.

From the foregoing description, it will be seen that if the rider pulls on the bridle reins 55, the breast-strap 53 of the martingale will be pulled forward, thereby moving the lower end of lever arm 49 to the rear, causing the cable 48 to pull the brake band 47 into engagement with the periphery of the gear housing 36, which is thus prevented from rotating. As the sprocket wheel 33 is rotated by sprocket chain 35, sleeve 32 will now be rotated independently of shaft 6 to drive gear 44, which in turn drives pinions 42 and 43, and the latter in turn drives gear 45, which is keyed on shaft 6, and therefore rotates the latter.

Owing to the gear ratio described, the gear 45 will move at a lower rate of speed than the gear 44 to the extent of being retarded a distance equal to 3⅓ teeth in every complete revolution of the gear 44. As the shaft 5 is always driven at a uniform rate of speed, the decrease in speed of the shaft 6 by applying the brake band to the gear housing, as described above, results in retarding the crank pins 16, with the result that there will occur a cycle of operation during which the degree of the rocking movement will increase from a minimum to a maximum through half a cycle of operation, and then will decrease from the maximum to the minimum during the remaining half of the cycle.

Another feature of my invention resides in the provision of novel means for supporting the body of the horse on the base 1 and this construction will now be described, referring particularly to Figures 1, 2, 5 and 10.

At two points on the under side of the body of the horse equally removed from its longitudinal center, I provide semi-spherical recesses 57 for removably receiving the upper ends of two tubular members 58, the lower ends of which are open. On the top of section 3 of the base I provide two semi-spherical recesses 59, corresponding in position to the recesses 57, that is to say, in vertical alignment therewith, in which are mounted the lower ends of two tubular members 60, the upper ends of which are telescoped, and have a sliding fit in the upper tubular member 58, as clearly shown in Figure 10. Mounted within each pair of tubular members 58 and 60 is a coil spring 61, which engages the upper and lower ends, respectively, of tubular members. With these tubular members in position in the respective recesses 57 and 59, it will be seen that the body of the horse will be yieldingly supported by the spring 61, the tubular members as a whole being free to rock back and forth by the engagement of their ends in the semi-spherical recesses 57 and 59, and the horse body can yield under the weight of the rider, by reason of the ability of the tubular member 58 to telescope over, or slide on the tubular member 60. By this construction, I yieldingly support the body of the horse on the base, and counteract the combined weight of the horse and rider in operation, the spring assisting in lifting such weight as the cranks 15 and 16 are making their upward movement.

Furthermore, the spring supports described having merely a socket connection with the horse and base respectively, can be readily inserted in position or removed, as the case may be.

A further feature of my invention relates to the provision of means for adjusting the throw of the horse body in the rocking movement thereof occasioned by rotating the crank disks 8 and 9, so that the severity of the movements through a cycle of operation may be increased to the maximum or decreased to the minimum. This I accomplish by the following mechanism:

Mounted on the rear of the base 1 are standards 62, pivotally mounted between which at the upper ends, as indicated at 63, Figures 2 and 5, is the lower end of a bar 64, the upper or inner end of which is pivotally connected, by means of a bolt 65, in one or the other of a series of apertures 66, provided in an arm 67, secured to the underside of the horse body and projecting downwardly therefrom, as indicated in Figs. 1 and 5. With the bolt 65 secured in the lowermost of the apertures 66 of arm 67, the horse body 10 will have the maximum throw, or widest range of movement, when operated by the revolution of the crank disks. By connecting the inner end of bar 64 higher up on arm 67, the throw, or range of movement, of the horse body will be lessened, the minimum effect being produced when the bolt 65 is secured in the uppermost aperture 66, when the rocking movement of the horse body will be very mild or gentle.

As in the case of the invention of my prior application, the motion of the horse body effected by rotating the crank disk simulates quite closely the motion or gait of a horse and by pulling on the bridle to apply the brake band to the gear housing, the gait of the horse may be changed, as previously explained, and if the rider prefers the gait which approximates any of the well known gaits of a horse, such as a gallop, trot, pace or the like, he can release the bridle when the horse body is moving at the gait desired, and thereafter the horse will continue to be operated at this gait; otherwise, if the bridle is held taut, the horse will go through the various gaits, or degrees of rocking movement, occurring throughout a cycle of operation of the mechanism.

I have shown in the drawings, and described in the specification, the best embodiment of my invention now known to me; but I wish it understood that except as may be specifically indicated in certain of the appended claims, the invention is not to be limited to the precise details of construction and combinations of parts illustrated and described.

I claim:

1. In a device of the class described, in combination with a base enclosing driving mechanism, two pairs of crank members located, respectively, at opposite ends of said base and adapted to be rotated simultaneously by said driving mechanism, a horse body having front and hind legs pivotally secured at their upper ends to the horse body and at their lower ends to the respective pairs of crank members, and means under the control of the rider for causing one pair of crank members to be rotated at a higher rate of speed than the other pair.

2. In a device of the class described, in combination with a base enclosing driving mechanism, two pairs of crank members located, respectively, at opposite ends of said base and adapted to be rotated simultaneously by said driving mechanism, a horse body having front and hind legs pivotally secured at their upper ends to the horse body and at their lower ends to the respective pairs of crank members, and means under the control of the operator for varying at will the relative positions of said pairs of crank members whereby to change the gait of the horse.

3. A mechanically operated hobby horse comprising, in combination, a base having on opposite sides thereof two pairs of rotatable crank members, a horse body having front and hind legs pivotally connected at their upper ends to said crank members, means for supporting the body of the horse, driving mechanism for simultaneously rotating said crank members, and differential mechanism included in said driving mechanism and operable, at the will of the rider to cause one pair of said crank members to rotate at a higher rate of speed than the other pair.

4. A mechanically operated hobby horse comprising, in combination, a base having on opposite sides thereof two pairs of rotatable crank members, a horse body having front and hind legs pivotally connected at their upper ends to the body and at their lower ends to said crank members, means for supporting the body of the horse, driving mechanism for simultaneously rotating said crank members, differential mechanism included in said driving mechanism and comprising a rotatable gear housing carrying members of said differential mechanism, a brake associated with said gear housing, and means operable by the rider to apply said brake to the gear housing, whereby to arrest its motion and cause the differential mechanism to effect a rotation of one pair of said crank members at a higher rate of speed than the other pair.

5. A mechanically operated hobby horse comprising, in combination, a base having on opposite sides thereof two pair of rotatable crank members, a horse body having front and hind legs pivotally connected at their upper ends to the body and at their lower ends to said crank members, means for supporting the body of the horse, driving mechanism for simultaneously rotating said crank members including differential mechanism, a rotatable gear housing carrying members of said differential mechanism, a brake for said gear housing, operating means for said brake, and a bridle secured on the horse's head and operatively connected with said brake operating means, whereby, by pulling on said bridle, said brake may be applied to arrest the gear housing and cause the differential mechanism to effect a rotation of one pair of crank members at a higher rate of speed than the other pair.

6. A mechanically operated hobby horse comprising, in combination, a base having on opposite sides thereof two pairs of rotatable crank members, a horse body having front and hind legs pivotally connected at their upper ends to the body and at their lower ends to said crank members, means for supporting the body of the horse, a motor driven shaft carrying one pair of crank members and a sprocket wheel, a second shaft carrying the other pair of crank members, a sleeve rotatably mounted thereon, a sprocket wheel keyed on said sleeve, a sprocket chain connecting said sprocket wheels, a gear keyed on said sleeve, a second gear of larger diameter keyed on said second shaft, a gear housing rotatably mounted on said sleeve carrying connected pinions of different size in mesh with said gears, the larger of said pinions meshing with the smaller of said gears, the gear ratio being such that with the gear housing free to rotate, said sleeve, gear housing, gears, pinions and said second shaft will be rotated in unison by the sprocket drive from the first named shaft, and means under the control of the rider for braking at will said gear housing whereby to arrest the motion thereof and cause said second shaft to be driven from said gear mechanism at a higher rate of speed than the first named shaft.

7. A mechanically operated hobby horse comprising, in combination, a base having on opposite sides thereof two pairs of rotatable crank members, a horse body having front and hind legs pivotally connected at their upper ends to the body and at their lower ends to said crank members, means for yieldingly supporting the body of the horse, driving mechanism for simultaneously rotating said crank members including differential mechanism, a rotatable gear housing carrying members of said differential mechanism, a brake band secured at one end to the base and partly surrounding said gear housing, a lever arm pivotally mounted intermediate its ends on said base, a cable connecting one end of said lever arm with the other end of said brake band, a martingale having a breast strap connected to the other end of said lever arm, and a bridle secured at its ends on the head of the horse and operatively connected with said martingale, whereby, by pulling on said bridle, said lever arm may be turned to apply said brake band and arrest the motion of said gear housing and thus cause the differential mechanism to rotate one pair of crank members at a higher rate of speed than the other pair.

8. In a mechanically operated hobby horse, in combination with a base, means for yieldingly supporting the body of the horse on said base comprising two telescoping tubular members enclosing a compression spring, the upper of said members being mounted in the horse's body and the lower of said members being loosely mounted at its lower end for pivotal movement on said base.

9. A mechanically operated hobby horse comprising, in combination, a base having on opposite sides thereof two pairs of rotatable crank members, a horse body having front and hind legs pivotally connected at their upper ends to the body and at their lower ends to said crank members, means for yieldingly supporting the body of the horse on said base, means for simultaneously rotating said crank members to cause a rocking movement of said horse, and means for varying the intensity of said rocking movement comprising an arm secured to and depending from the underside of the horse body, a bar pivotally connected at its outer end to said base, and means for securing the inner end of said bar in adjusted positions on said depending arm.

In testimony whereof, I have hereunto set my hand.

JAMES OTTO HAHS.